United States Patent Office 2,900,417
Patented Aug. 18, 1959

2,900,417

3,3' - DIISOPROPYL - 5,5' - DI - TERT - BUTYL-4,4'-DIHYDROXYDIPHENYL, ITS PREPARATION AND USE

Allen H. Filbey, Royal Oak, and Thomas H. Coffield, Detroit, Mich., assignors to Ethyl Corporation, New York, N.Y., a corporation of Delaware No Drawing. Application March 21, 1955
Serial No. 495,788

1 Claim. (Cl. 260—620)

This invention relates to a novel chemical compound possessing outstanding antioxidant potency.

Among the objects of this invention is that of providing a chemical compound of extraordinary effectiveness as an antioxidant.

The objects of this invention are accomplished by 3,3'-diisopropyl-5,5'-di-t-butyl-4,4'-dihydroxydiphenyl.

It has the formula

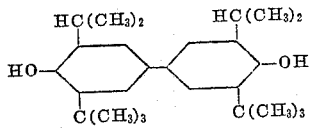

The compound of this invention is highly soluble in hydrocarbons such as gasoline, diesel fuel, lubricating oil, and the like.

3,3'-diisopropyl-5,5'-di-t-butyl-4,4' - dihydroxydiphenyl can be prepared by the oxidation of 2-isopropyl-6-t-butyl phenol to 3,3'-diisopropyl-5,5'-di-t-butyl diphenoquinone which is then reduced to form our novel compound. The oxidation is effected by the use of such oxidizing agents as chromic acid, nitric acid, ferric chloride, or the like. Reduction is accomplished by the use of such reducing agents as stannous chloride, ferrous chloride, zinc and acetic acid, or the like.

The following example in which all parts and percentages are by weight illustrates the two-step preparation of the compound of this invention.

*Example*

Step 1.—In a reaction vessel equipped with stirring and heating means and refluxing apparatus are placed 10 parts of 2-isopropyl-6-t-butyl phenol, 40 parts of ferric chloride hexahydrate, 100 parts of ethanol, and 500 parts of water. This mixture is heated to reflux and emulsified with rapid stirring for 3 hours. At the end of this time, the stirring is stopped, the temperature reduced to about 25° C., and the organic material removed by extraction with ether. The ether extract is dried over sodium sulfate and evaporated to give 3,3'-diisopropyl-5,5'-di-t-butyldiphenoquinone.

Step 2.—3,3'-diisopropyl-5,5'-di-t-butyldiphenoquinone (2 parts) is dissolved in refluxing glacial acetic acid (50 parts). To this is added in small portions powdered zinc. When the solution becomes colorless, the zinc is removed by filtration and the solution is poured into 200 parts of ice water. The white solid which precipitates is recovered by filtration, washed with water, and crystallized from a 25:75 percent water-ethanol solution. 3,3'-diisopropyl - 5,5' - di-t-butyl - 4,4' - dihydroxydiphenyl is formed and, when subjected to chemical analysis, corresponds to the empirical formula $C_{26}H_{38}O_2$.

To illustrate the pre-eminence of our novel compound as an antioxidant, a series of standard oxygen stability tests is conducted employing a representative gasoline normally susceptible to deterioration in the presence of oxygen, air, or ozone. These tests involve the addition of 4 milligrams of a compound to be tested to each 100 milliliters of gasoline which is then subjected to conditions conducive to the absorption of oxygen.

The absorption of oxygen by hydrocarbon fuels is measured directly by the standard method of the American Society for Testing Materials for the determination of the oxidation stability of gasoline (induction method). ASTM designation: D525–46, as fully described in Part III-A, ASTM Standards for 1946. According to this method, the induction period is the period during which there is no drop in pressure, indicating no absorption of oxygen, when the test material is placed in a testing bomb maintained at a temperature of 100° C. with an initial pressure of 100 pounds p.s.i. gauge of oxygen.

3,3'-diisopropyl-5,5'-di-t-butyl-4,4' - dihydroxydiphenyl finds important utility as an antioxidant in a wide variety of oxygen sensitive materials. Thus, the addition of small quantities of our compound, to such materials as turbine, hydraulic, transformer, or other highly refined industrial oils; waxes, elastomers including natural rubber; crankcase lubricating oils; soaps and greases; plastics; and organometallic compositions such as tetraethyllead and tetraethyllead antiknock fluids, and the like greatly increases their resistance to deterioration in the presence of oxygen, air, or ozone. The amounts so employed are dependent upon the nature of the material to be protected and the conditions to be encountered. Generally speaking, amounts in the order of about 0.001 to about 1 percent by weight of the material to be protected are satisfactory.

We claim:
3,3'-diisopropyl-5,5'-di-t-butyl-4,4' - dihydroxydiphenyl having the formula

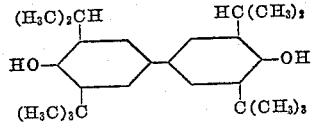

References Cited in the file of this patent

UNITED STATES PATENTS

| | | |
|---|---|---|
| 2,092,725 | Britton et al. | Sept. 7, 1937 |
| 2,131,258 | Stoesser et al. | Sept. 27, 1938 |
| 2,171,780 | Ayres | Sept. 9, 1939 |
| 2,310,710 | Rosenwald et al. | Feb. 9, 1943 |
| 2,479,948 | Luten et al. | Aug. 23, 1949 |
| 2,785,188 | Coe | Mar. 12, 1957 |

OTHER REFERENCES

Stillson et al.: Jour. Amer. Chem. Soc., vol. 67 (1945), pp. 303–307.